(12) United States Patent
K et al.

(10) Patent No.: US 11,909,608 B1
(45) Date of Patent: Feb. 20, 2024

(54) BIFURCATED TELEMETRY DATA INGESTION METHODS AND SYSTEMS

(71) Applicant: HONEYWELL INTERNATIONAL INC., Charlotte, NC (US)

(72) Inventors: Shubhanjali K, Bengaluru (IN); Sharmila Muthukrishnan, Bengaluru (IN); Sagar Datta, Bengaluru (IN); Rahul Pandey, Bengaluru (IN); Kushal Ramesh, Bengaluru (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/334,877

(22) Filed: Jun. 14, 2023

(30) Foreign Application Priority Data

Apr. 28, 2023 (IN) .............................. 202311030624

(51) Int. Cl.
| | |
|---|---|
| *H04L 12/46* | (2006.01) |
| *H04L 12/26* | (2006.01) |
| *H04L 12/24* | (2006.01) |
| *H04L 43/04* | (2022.01) |
| *H04L 43/08* | (2022.01) |

(52) U.S. Cl.
CPC .............. *H04L 43/04* (2013.01); *H04L 43/08* (2013.01)

(58) Field of Classification Search
CPC ......... H04L 43/04; H04L 43/08; H04L 12/26; H04L 12/24

USPC ......................................................... 709/224
See application file for complete search history.

(56) References Cited

U.S. PATENT DOCUMENTS

| | | | |
|---|---|---|---|
| 11,409,756 B1 * | 8/2022 | Park ..................... | G06F 16/254 |
| 11,537,942 B1 * | 12/2022 | Vogler-Ivashchanka ................... | |
| | | | G06F 16/9038 |
| 2019/0123959 A1 | 4/2019 | Joshi et al. | |
| 2019/0363971 A1 * | 11/2019 | Mermoud ............. | H04L 43/045 |

\* cited by examiner

*Primary Examiner* — Jude Jean Gilles
(74) *Attorney, Agent, or Firm* — Lorenz & Kopf LLP

(57) ABSTRACT

Cloud-based systems and methods are provided for managing data uploaded from gateway devices at different sites. One method involves a platform service obtaining telemetry data from a gateway device, assigning a first subset of the telemetry data having first temporal characteristics to a first processing pipeline, and assigning a second subset of the telemetry data having second temporal characteristics to a second processing pipeline based at least in part on metadata associated with the telemetry data. The first processing pipeline is configurable to write the first subset of the telemetry data to a data storage element concurrent to the second processing pipeline writing the second subset of the telemetry data to the data storage element. The first and second subsets of the telemetry data are mutually exclusive, and the first temporal characteristics and the second temporal characteristics are different.

20 Claims, 5 Drawing Sheets

BIFURCATED TELEMETRY DATA INGESTION METHODS AND SYSTEMS

CROSS REFERENCE TO RELATED APPLICATION

This application claims priority to India Provisional Patent Application No. 202311030624, filed Apr. 28, 2023, the entire content of which is incorporated by reference herein.

TECHNICAL FIELD

The subject matter described herein relates generally to cloud-based Internet of things (IoT) platforms, and more particularly, embodiments of the subject matter relate to Industrial Internet of things (IIoT) platforms with time-based bifurcation of telemetry data streams.

BACKGROUND

Industrial process control and automation systems are used to automate large or complex industrial processes. Recently, these systems have evolved to utilize connected Internet of things (IoT) devices in cloud computing environments, which may alternatively be referred to as Industrial Internet of things (IIoT). In IIoT systems, various sensors or other measurement devices are often deployed to a particular warehouse, distribution center, manufacturing facility, or any other sort of building, site or premises, which may alternatively be referred to as an IIoT edge node. A gateway device at the IIoT edge node establishes communications with the cloud-based IIoT platform and uploads telemetry data from the various sensors or other measurement devices deployed at that edge node over the Internet or another suitable communications network to the cloud-based IIoT platform.

A cloud-based IoT platform may be responsible for ingesting various different types of telemetry data from any number of different devices, which may be deployed to any number of different edge nodes. For example, a multi-tenant cloud-based IoT platform may support any number of different customers or users at various different geographic locations, where the type, volume and frequency of telemetry data to be handled by the IoT platform may vary from customer to customer and from site to site. In this regard, it is desirable for a multi-tenant cloud-based IoT platform to be robust, scalable, and efficient, such that the IoT platform is capable of processing different types and volumes of telemetry data in near real-time.

In practice, an edge node may experience a loss of connectivity that interferes with uploading telemetry data from a site to the IoT platform in real-time. A gateway device at an edge node may buffer telemetry data from the various IoT devices at the site until connectivity is restored, at which point, the gateway device may resume streaming real-time telemetry data to the IoT platform in addition to uploading the buffered telemetry data. This results in a burst in bandwidth associated with that edge node at the cloud-based IoT platform which could impact the ability of the cloud-based IoT platform to service other edge nodes in real-time. Accordingly, it is desirable to provide a cloud-based IoT platform capable of supporting multiple tenants and maintaining real-time performance while also accommodating bursts of backfilled data from individual edge nodes. Other desirable features and characteristics will become apparent from the subsequent detailed description and the appended claims, taken in conjunction with the accompanying drawings and this background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Cloud-based computing systems and related methods and apparatus are provided for managing data uploaded over a network from a gateway device at a site, such as, for example, telemetry data from an edge node in an Industrial Internet of things (IIoT) application. An exemplary method involves a platform service at a server of the cloud-based computing system obtaining telemetry data from a gateway device and assigning a first subset of the telemetry data having first temporal characteristics to a first processing pipeline of the cloud-based computing system and a second subset of the telemetry data having second temporal characteristics to a second processing pipeline of the cloud-based computing system based at least in part on metadata associated with the telemetry data. The first subset and the second subset are mutually exclusive, the first temporal characteristics and the second temporal characteristics are different, and the first processing pipeline is configurable to write the first subset of the telemetry data to a data storage element concurrent to the second processing pipeline writing the second subset of the telemetry data to the data storage element.

An apparatus is also provided for a computer-readable medium having computer-executable instructions stored thereon that, when executed by a processing system of a cloud-based computing system, cause the processing system to obtain telemetry data from a gateway device and assign a first subset of the telemetry data having first temporal characteristics to a first processing pipeline of the cloud-based computing system and a second subset of the telemetry data having second temporal characteristics to a second processing pipeline of the cloud-based computing system based at least in part on metadata associated with the telemetry data. The first subset and the second subset are mutually exclusive, the first temporal characteristics and the second temporal characteristics are different, and the first processing pipeline is configurable to write the first subset of the telemetry data to a data storage element concurrent to the second processing pipeline writing the second subset of the telemetry data to the data storage element.

A cloud-based computing system is also provided. The cloud-based computing system includes a data storage element and a server coupled to the data storage element and a network to provide a platform service for obtaining telemetry data uploaded to the cloud-based computing system over the network from a gateway device at a site. The platform service is configurable to assign a first subset of the telemetry data having first temporal characteristics to a first processing pipeline of the cloud-based computing system and a second subset of the telemetry data having second temporal characteristics to a second processing pipeline of the cloud-based computing system based at least in part on metadata associated with the telemetry data. The first subset and the second subset are mutually exclusive, the first temporal characteristics and the second temporal characteristics are different, and the first processing pipeline is configurable to write the first subset of the telemetry data to a data storage element concurrent to the second processing pipeline writing the second subset of the telemetry data to the data storage element.

Furthermore, other desirable features and characteristics of the subject matter described herein will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the subject matter of the application and uses thereof. Furthermore, there is no intention to be bound by any expressed or implied theory presented in the preceding technical field, background, brief summary, or the following detailed description.

Embodiments of the subject matter described herein generally relate to a robust, efficient and scalable cloud-based platform capable of ingesting telemetry data substantially in real-time while adaptively handling bursts of older telemetry data, such as, for example, a burst of backlogged or historical telemetry data accumulated at an edge node that is uploaded to backfill a time series data set. For purposes of explanation, the subject matter is described herein primarily in the context of Industrial Internet of things (IIoT) applications where telemetry data from warehouses, distribution centers, manufacturing facilities or other industrial facilities is uploaded from remote sites to a cloud-based platform service capable of supporting analytics, reporting and other analysis across multiple different tenants or sites. That said, it should be appreciated that the subject matter described herein is not necessarily limited to IIoT applications or cloud-based systems and may be implemented in an equivalent manner in the context of any other suitable system or platform.

As described in greater detail below, in practice, there are situations where gateway devices at edge nodes in a cloud-based IIoT system may attempt to transmit bursts of data or otherwise exhibit bandwidth fluctuations. To mitigate bandwidth-induced latencies with respect to processing real-time telemetry data, a software service or process associated with the cloud-based IIoT system analyzes metadata associated with telemetry data messages uploaded from edge nodes to bifurcate the uploaded telemetry data message into separate data ingestion streams based on timestamps or other temporal characteristics associated with the telemetry data. In this manner, more recent or real-time telemetry data is assigned to its own pipeline where it is processed and analyzed separate from historical or backlogged data, thereby preventing bursts of backlogged telemetry data from one particular edge node or site from degrading processing of real-time telemetry data from other edge nodes or sites in a multi-tenant environment. For example, more recent or real-time telemetry data can be written to a time series database independently of and in parallel to a separate processing pipeline writing backlogged historical data to the time series database, thereby allowing the time series data sets to be backfilled in the time series without impacting the performance and ability of analytics and reporting services to provide accurate and up-to-date information using the more recent or real-time telemetry data.

Figure 1:
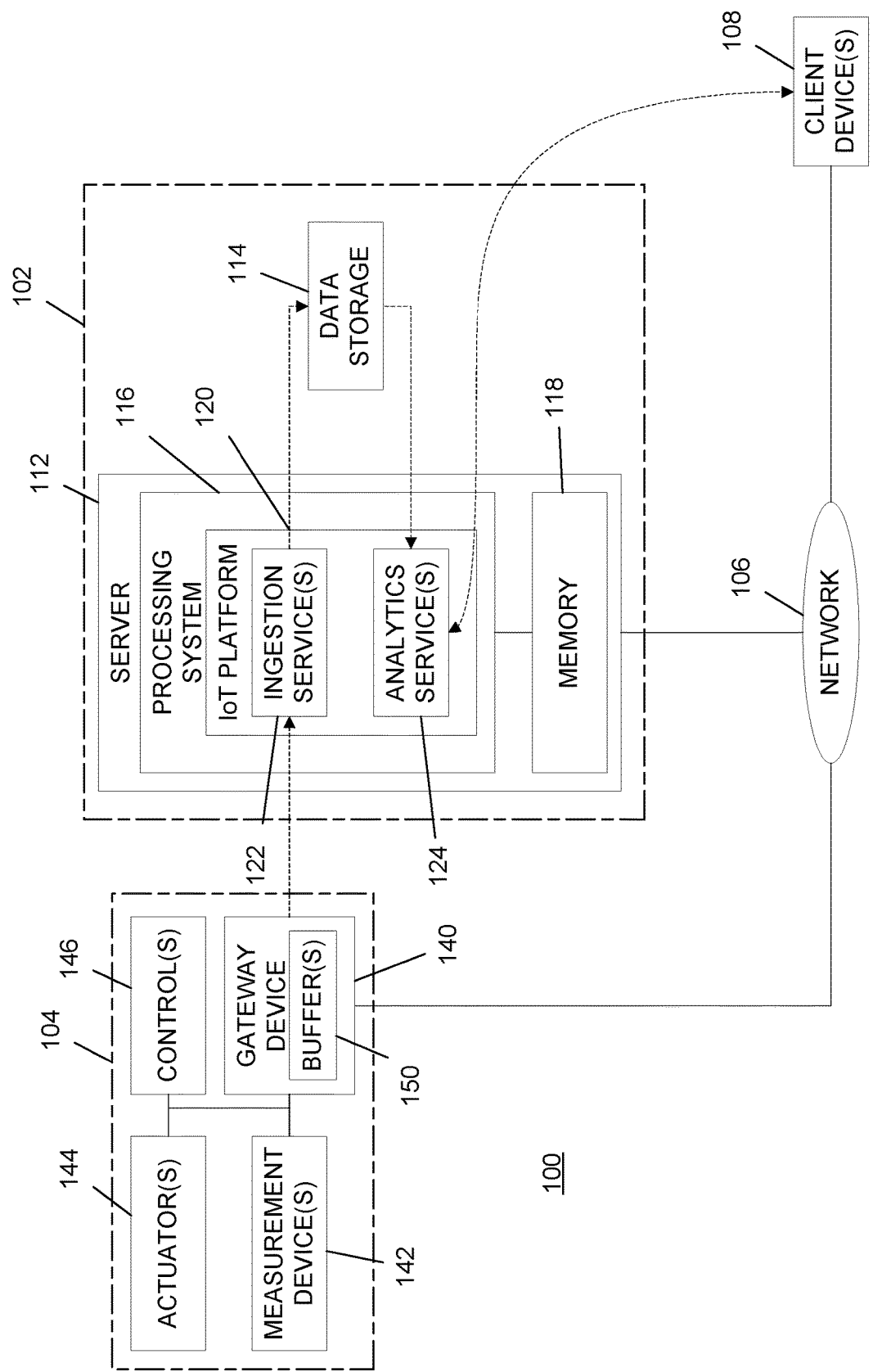
FIG. 1 is a block diagram illustrating a computing system configurable to support Internet of Things (IoT) applications in accordance with one or more exemplary embodiments.

FIG. 1 depicts an exemplary system 100 that includes a cloud-based computing system 102 capable of supporting any number of different edge computing systems 104 communicatively coupled to the cloud-based computing system 102 over a communications network 106, such as, for example, the Internet, a cellular network, a mobile network, a local area network (LAN), a wide area network (WAN), or any other suitable telecommunications network. In this regard, the edge computing systems 104 may be located at any number of different warehouses, distribution centers, manufacturing facilities, industrial facilities or other sites, which may be associated with any number of different tenants or organizations in a multi-tenant implementation. As described in greater detail below, the cloud-based computing system 102 receives or otherwise obtains telemetry data from the different edge computing systems 104 over the network 106 and maintains the uploaded telemetry data in one or more data storage elements 114 associated with the cloud-based computing system 102, thereby allowing the cloud-based computing system 102 to provide analytics, reporting and other analysis based on the telemetry data to one or more client devices 108.

The illustrated cloud-based computing system 102 includes one or more servers 112 that are communicatively coupled to one or more data storage elements 114 configured to support the operation of the cloud-based computing system 102 described herein. In this regard, the cloud-based computing system 102 may be realized as a remote data center or a distributed network of remote data centers that reside at geographic locations that are separate and distinct from the edge computing systems 104. The server 112 generally represents a server computing device or system that includes at least one processing system 116, which generally represents the control module or other hardware suitably configured to support operation of the server 112 described herein. In this regard, the processing system 116 may include or otherwise be realized using a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The processing system 116 includes or otherwise accesses a data storage element 118 (or memory), which may be realized as any sort of non-transitory short or long term storage media capable of storing programming instructions for execution by the processing system 116. The code or other computer-executable programming instructions, when read and executed by the processing system 116, cause the processing system 116 to support or otherwise perform certain tasks, operations, functions, and/or processes described herein. Depending on the embodiment, the memory 118 may be physically realized using random-access memory (RAM), read-only memory (ROM), flash memory, registers, a hard disk, or another suitable data storage medium known in the art or any suitable combination thereof.

In exemplary implementations, the computer-executable programming instructions are executed by the processing system 116 to generate, execute, or otherwise implement a software platform 120 that includes various processes or services 122, 124 that are configurable to support the subject matter described herein. In this regard, the software platform 120 may alternatively be referred to herein as an IoT platform or IIoT platform. The IoT platform 120 includes one or more data ingestion services 122 that are configurable to receive telemetry data messages from edge computing systems 104 over the communications network 106 and write or otherwise store the received telemetry data to the one or more data storage elements 114 associated with the cloud-based computing system 102. In this regard, the data storage elements 114 may include one or more time series databases, data lake databases, or any other suitable data repository. It should be noted that although FIG. 1 depicts the data storage elements 114 as being part of the same cloud-based computing system 102 as the server 112, in practice, the data storage elements 114 may be realized as or otherwise associated with another cloud-based computing system that is distinct, external, or otherwise separate from the cloud-based computing system 102 (e.g., at a different data center associated with a different data center operator).

The IoT platform 120 also includes one or more data analytics services 124 that are configurable to analyze the telemetry data maintained in the data storage element(s) 114 associated with the cloud-based computing system 102 to support analytics, reporting and other analysis by providing corresponding graphical user interface (GUI) displays, reports or other user notifications via client devices 108 communicatively coupled to the cloud-based computing system 102. In this regard, the client devices 108 generally represent any sort of mobile computing device, mobile telephone, smartphone, laptop, tablet, personal computer or other network-enabled electronic device that includes an electronic display device capable of graphically presenting data and/or information along with one or more user input devices capable of receiving input from the user of the client device 108. In practice, the client device 108 generally includes a processing system that includes or is otherwise coupled to a data storage element having programming instructions or code that, when read and executed, cause the processing system to generate or otherwise facilitate a web browser or other client-side application on the client device 108 that supports interaction with the data analytics services 124 at the IoT platform 120 to present the GUI displays, reports or other user notifications generated by the data analytics services 124 within the client-side application at the client device 108.

Still referring to FIG. 1, the edge computing system 104 generally represents the combination of devices and systems collocated at a common site or premises to support or otherwise provide industrial process control and automation in the context of an IIoT application. In this regard, the edge computing system 104 generally includes one or more measurement devices 142, one or more actuators 144 and one or more controllers 146 that are communicatively coupled to the cloud-based computing system 102 over a communications network 106 via a gateway device 140 at the edge computing system 104.

The measurement devices 142 generally represent the sensors or other measurement units deployed at the site associated with the edge computing system 104 to provide telemetry data or other measurement data by sensing, measuring, detecting or otherwise quantifying a characteristic or condition at the site, such as, for example, an environmental condition (e.g., temperature, humidity, or the like) or an operational condition or characteristic associated with an industrial process or one or more actuators 144 at the site (e.g., the current state or configuration of a valve, the current volume or rate of fluid flow through particular valve or location, the current pressure of fluid at a particular valve or location, and/or the like). It should be noted that any number of different potential measurement devices 142 may be deployed and configured in a manner that will vary to obtain a variety of different types of telemetry data, depending on the particular site and/or site operator, and the subject matter described herein is not limited to any particular type or configuration of measurement devices 142.

The actuators 144 generally represent the mechanical, electrical, magnetic, electromagnetic, pneumatic, hydraulic or other sort of mechanism or component capable of influencing a characteristic or condition at the site, such as, for example, environmental conditions or operational conditions that are sensed or quantified by the measurement devices 142. For example, an actuator 144 may be configured to operate a valve which influences a fluid flow or pressure measured by one of the measurement devices 142 at the site. Again, it should be noted that any number of different potential actuators 144 may be deployed and configured in a manner that will vary depending on the particular site and/or site operator, and the subject matter described herein is not limited to any particular type or configuration of actuators 144.

The controllers 146 generally represent the hardware, firmware and/or software components or devices associated with the edge computing system 104 that support control of one or more industrial processes at the site. For example, a first set of controllers 146 may use sensed measurement data obtained from one or more measurement devices 142 to control the operation of one or more actuators 144, while a second set of controllers 146 could be used to optimize the control logic or other operations performed by the first set of controllers, a third set of controllers 146 could be used to perform additional functions, and so on. The controllers 146 could therefore support a combination of approaches, such as regulatory control, advanced regulatory control, supervisory control, and advanced process control using any suitable structure for controlling one or more aspects of an industrial process. At least some of the controllers 146 could, for example, represent proportional-integral-derivative (PID) controllers or multivariable controllers, such as controllers implementing model predictive control (MPC) or other advanced predictive control (APC).

The gateway device 140 generally represents the combination of hardware, software and/or firmware associated with one or more network interfaces that are connected to the communications network 106 and the other edge devices 142, 144, 146 to function as a communications hub and support data transfer between the edge devices 142, 144, 146 and the IoT platform 120. For example, the gateway device 140 may include an Ethernet networking interface, a wireless transceiver, a cellular transceiver, or another suitable combination of hardware, firmware and/or software to support communications to/from the communications network 106. Additionally, the gateway device 140 may include one or more additional Ethernet networking interfaces, a wireless transceivers, network interface cards, or the like to support communications with edge devices 142, 144, 146 at the edge computing system 104. For example, in some implementations, the gateway device 140 is coupled to the various edge devices 142, 144, 146 using Ethernet or another wired LAN, wireless LAN, a pneumatic control network, or any other network suitable for supporting IoT devices at the edge computing system 104, where the edge devices 142, 144, 146 communicating on the network associated with the edge computing system 104 are unable to communicate over the communications network 106 independent of the gateway device 140.

The gateway device 140 may also execute or otherwise support one or more software applications or processes to support the subject matter described herein. Moreover, the gateway device 140 may execute applications or otherwise support one or more operator consoles at the edge computing system 104 that allow operator access to and interaction with one or more of the edge devices 142, 144, 146, for example, to provide information identifying a current state of an industrial process to the operator, such as values of various process variables and warnings, alarms, or other states associated with the industrial process (e.g., based on data from the local devices 142, 144, 146). An operator console could request information affecting how the industrial process is controlled, such as by requesting setpoints or control modes for process variables controlled by the controllers 146 or other information that alters or affects how the controllers 146 control the industrial process. This could include requesting this information from the controllers 146, from other edge devices 142, 144 or from the IoT platform 120. In such implementations, the gateway device 140 may include any suitable hardware, firmware and/or software that supports displaying information and interacting with an operator at the edge computing system 104.

As described in greater detail below, in one or more exemplary implementations, the gateway device 140 includes or accesses one or more buffers 150 or other suitable data storage capable of maintaining telemetry data from the various edge devices 142, 144, 146, including, but not limited to, measurement data provided by the measurement devices 142, actuation state data provided by the actuators 144 and/or control information or data provided by the controllers 146. In response to a loss of connectivity between the gateway device 140 and the IoT platform 120, a telemetry data streaming service or other telemetry data transfer service associated with the gateway device 140 is configurable to store or otherwise maintain telemetry data provided by the various edge devices 142, 144, 146 in the buffer(s) 150 until connectivity is restored. In response to detecting an available communication connection between the gateway device 140 and the IoT platform 120 and/or network 106, in one or more implementations, the telemetry data streaming service or other telemetry data transfer service associated with the gateway device 140 is configurable to automatically upload or otherwise transmit any backlogged historical telemetry data from the buffer(s) 150 to the ingestion service 122 associated with the IoT platform 120. In this regard, some implementations of the gateway device 140 utilize the backlogged historical telemetry data in the buffer(s) 150 to generate a stream of telemetry data messages that are streamed, transmitted or otherwise uploaded to the IoT platform 120 automatically in response to reestablishment of a communication connection with the IoT platform 120, resulting in a burst or surge of telemetry data messages to be ingested at the IoT platform 120.

Figure 2:
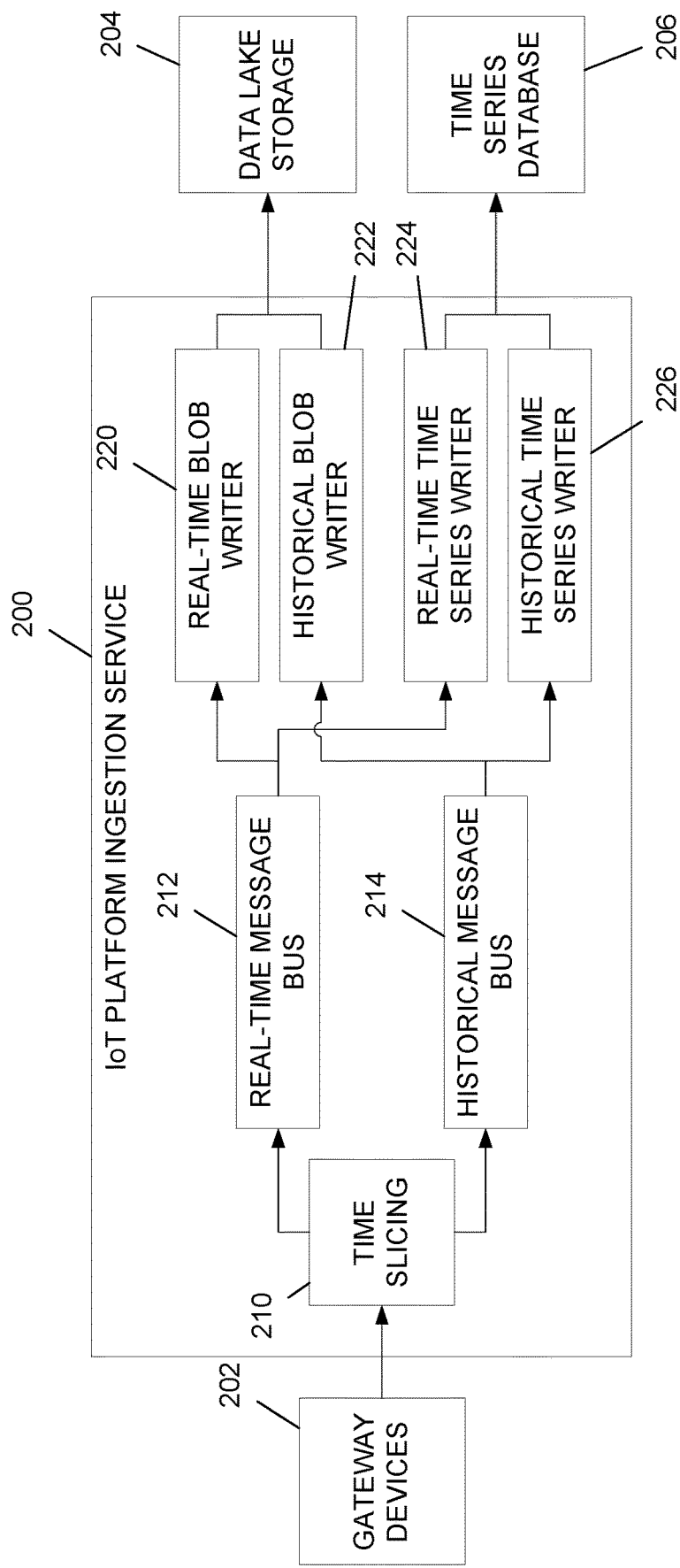
FIG. 2 is a block diagram of an IoT platform data ingestion service suitable for use in the computing system of FIG. 1 in an exemplary embodiment.

FIG. 2 depicts an exemplary embodiment of a IoT platform ingestion service 200 suitable for implementation at an IoT platform 120 (e.g., data ingestion service 122) in the context of an IIoT application to bifurcate telemetry data messages from gateway devices 202 (e.g., instances of gateway device 140) into separate message streams assigned to separate processing pipelines based on temporal characteristics. The processing pipelines of the IoT platform ingestion service 200 write the received telemetry data of the different message streams to different data storage elements 204, 206 (e.g., instances of data storage element 114) in parallel or concurrently, such that backlogged historical telemetry data does not influence processing of the more recent telemetry data.

The IoT platform ingestion service 200 includes a time slicing service 210 that generally represents the process, subroutine or other component associated with the IoT platform ingestion service 200 that analyzes metadata associated with uploaded telemetry data messages received from the gateway devices 202 to assign and route the telemetry data messages to different processing pipelines by assigning the telemetry data messages to different message buses 212, 214 depending on the timestamps or other temporal characteristics associated with the respective telemetry data messages. The respective subsets of uploaded telemetry data messages assigned to the different message buses 212, 214 are mutually exclusive, such that an uploaded telemetry data message is assigned to only one of the message buses 212, 214.

For example, in one implementation, the time slicing service 210 analyzes a timestamp associated with the latest or most recent sample of telemetry data contained in each uploaded telemetry data message to determine whether an amount of time that has elapsed since the telemetry data sample was obtained is greater than a threshold amount of time, which may alternatively be referred to herein as a real-time classification threshold. In this regard, when the amount of elapsed time since the most recent sample of telemetry data of the respective message is less than the threshold, the time slicing service 210 routes or otherwise assigns that respective uploaded telemetry data message to a message bus 212 associated with a more recent subset of telemetry data, which may alternatively be referred to herein as the real-time message bus 212. On the other hand, when the amount of elapsed time since the most recent sample of telemetry data of the respective message is greater than the real-time classification threshold, the time slicing service 210 routes or otherwise assigns that respective uploaded telemetry data message to a different message bus 214 associated with a separate processing pipeline for an older subset of telemetry data, which may alternatively be referred to herein as the historical message bus 214.

The message buses 212, 214 generally represent the data streaming services or other components associated with the IoT platform ingestion service 200 that are capable of ingesting messages with high throughput and low latency while decoupling the downstream consumer components 220, 222, 224, 226 of the IoT platform ingestion service 200 from senders upstream (e.g., time slicing service 210 and gateway devices 202). In this regard, the message buses 212, 214 are configurable to function as an event bus or an event hub that maintains telemetry data messages assigned to the respective message bus 212, 214 (e.g., in a queue or buffer) for retrieval and processing by downstream event consumers 220, 222, 224, 226.

The illustrated IoT platform ingestion service 200 includes a first set of data writing services 220, 222 that are configurable to access or otherwise retrieve telemetry data messages from a respective one of the message buses 212, 214 to write the corresponding telemetry data messages to a data lake storage element 204. In this regard, the data lake storage element 204 generally represents a repository for storing files, blobs or other units of data in any sort of structured or unstructured format. Accordingly, for purposes of explanation, the data writing services 220, 222 configurable to write the telemetry data messages to the data lake storage element 204 may alternatively be referred to herein as blob writers. The IoT platform ingestion service 200 includes an instance of a real-time blob writer 220 that is configured to write more recent telemetry data messages from the real-time message bus 212 to the data lake storage element 204 concurrently to and in parallel with a historical blob writer 222 that is configured to write backlogged or historical telemetry data messages from the historical message bus 214 to the data lake storage element 204. In this regard, the real-time blob writer 220 monitors or otherwise listens to the real-time message bus 212 for telemetry data messages to be processed, while the historical blob writer 222 monitors or otherwise listens to the historical message bus 214.

In one or more implementations, each of the blob writers 220, 222 includes autoscaling capability to dynamically increase or decrease available processing threads or computational resources, depending on the volume of messages associated with the respective message bus 212, 214. In some implementations, the autoscaling configuration of the blob writers 220, 222 may be different from one another, such that the real-time blob writer 220 autoscales up processing resources more quickly to reduce the latency with respect to the more recent or real-time telemetry data, while the historical blob writer autoscales up processing resources more conservatively given the backlogged historical telemetry data may not be utilized for real-time analytics and/or real-time performance monitoring.

The IoT platform ingestion service 200 also includes a second set of data writing services 224, 226 that are configurable to access or otherwise retrieve telemetry data messages from a respective one of the message buses 212, 214 to write the corresponding telemetry data samples contained in the respective telemetry data messages to a time series database 206. In this regard, the time series database 206 generally represents a repository or other storage system that stores or otherwise maintains associated pairs of times and data values. Accordingly, for purposes of explanation, the data writing services 224, 226 configurable to write the telemetry data samples to the time series database 206 may alternatively be referred to herein as time series writers. The real-time time series writer 224 monitors or otherwise listens to the real-time message bus 212 for telemetry data messages to be processed. The real-time time series writer 224 accesses, retrieves or otherwise obtains telemetry data samples from the respective telemetry data messages in the real-time message bus 212, and writes the corresponding pairs of timestamps and corresponding telemetry data sample values from the telemetry data samples contained in a respective telemetry data message to the appropriate table or location in the time series database 206. In this regard, the time series database 206 may maintain a time series set of telemetry data associated with a particular site or edge computing system 104 that is distinct from time series data sets associated with other sites or edge computing systems 104.

In a similar manner, historical time series writer 226 monitors or otherwise listens to the historical message bus 214 for telemetry data messages to be processed, accesses, retrieves or otherwise obtains telemetry data samples from the respective telemetry data messages in the historical message bus 214, and writes the corresponding pairs of timestamps and corresponding telemetry data sample values to the appropriate table or location in the time series database 206. Thus, the historical time series writer 226 may backfill the time series set of telemetry data associated with a particular site or edge computing system 104 with historical telemetry data samples concurrently to or in parallel with the real-time time series writer 224 writing more recent telemetry data samples to the time series database 206. As a result, the performance of real-time analytics, reporting or other analysis of the time series data set associated with a particular site or edge computing system 104 is maintained while the time series data set is backfilled with backlogged historical data from that site or edge computing system 104 to support trend analysis or other historical analysis. Similar to the blob writers 220, 222, each of the time series writers 224, 226 may include autoscaling capability to dynamically increase or decrease available processing threads or computational resources, depending on the volume of messages associated with the respective message bus 212, 214, where the real-time time series writer 224 may be configured to autoscale up processing resources more quickly or more aggressively than the historical time series writer 226 which may have a different autoscaling configuration.

By virtue of the time slicing service 210 at the IoT platform service 200, uploaded telemetry data messages are bifurcated into separate processing streams, which are independently scalable to adapt to the bandwidth or throughput associated with the uploaded telemetry data messages received from the various senders. In this regard, the real-time message bus 212 and real-time writers 220, 224 function as a real-time processing pipeline for real-time or more recent telemetry data, while the historical message bus 214 and historical writers 222, 226 function as a historical processing pipeline for older or backlogged telemetry data. Thus, when a particular gateway device 202 uploads a burst of backlogged historical telemetry data, the time slicing service 210 routes the backlogged historical telemetry data messages to the historical message bus 214 for writing the backlogged historical telemetry data to the data storage elements 204, 206 independent from the more recent or real-time telemetry data. As a result, surges or bursts of backlogged data from gateway devices 202 do not impair processing of real-time telemetry data from other gateway devices 202, such that an outage or other connectivity issue with a particular site or tenant does not impact the real-time performance of the IoT platform 120 with respect to other sites or tenants.

For example, in the absence of the time slicing service 210, when gateway devices 140 upload backlogged telemetry data with increased frequency or higher volumes, real-time telemetry data from other gateway devices 140 could otherwise be queued behind backlogged historical telemetry data, thereby increasing latency in processing the real-time telemetry data that degrades performance of the real-time analytics to be provided based on that real-time telemetry data. In contrast, the IoT platform service 200 adapts to handle gateway devices 140 sending higher frequencies or volumes of backlogged telemetry data in abnormal or anomalous patterns to prevent older telemetry data from impacting the processing of contemporaneous real-time telemetry data. The time slicing service 210 is designed to be fast and lightweight to quickly segregate and bifurcate messages based on temporal metadata (e.g., timestamps or other indicia of real-time or historical telemetry data) to reduce latency between the IoT platform service 200 receiving an uploaded telemetry data message and that telemetry data message being routed to the appropriate message bus 212, 214.

Figure 3:
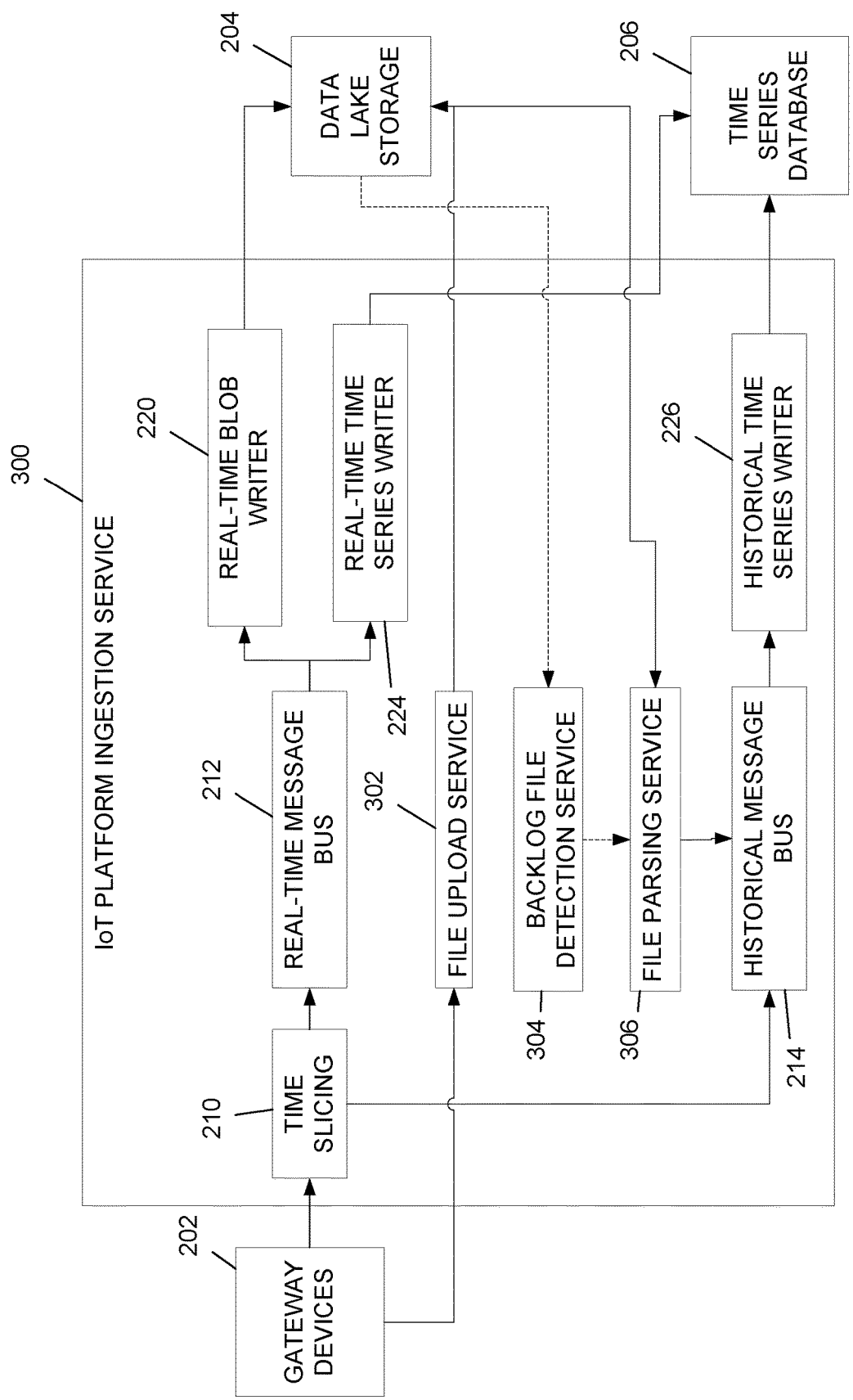
FIG. 3 is a block diagram of an IoT platform data ingestion service suitable for use in the computing system of FIG. 1 in an exemplary embodiment.

FIG. 3 depicts another exemplary embodiment of a IoT platform ingestion service 300 suitable for implementation at an IoT platform 120 (e.g., data ingestion service 122) in the context of an IIoT application to ingest and process backlogged historical telemetry data independent from more recent or real-time telemetry data. Various elements of the IoT platform ingestion service 300 are similar to counterpart elements described above in the context of FIGS. 1-2 and will not be redundantly described in detail in the context of FIG. 3.

In the implementation depicted in FIG. 3, telemetry data streaming service or other telemetry data transfer service associated with the gateway devices 202 is configured to package, store or otherwise maintain backlogged telemetry data samples in one or more files that are uploaded or otherwise transferred to a file upload service 302 at the IoT platform ingestion service 300, which, in turn, writes the uploaded file(s) to the data lake storage element 204. In such implementations, the telemetry data streaming service, telemetry data transfer service or other software at a gateway device 202 includes logic to automatically differentiate between backlogged or historical telemetry data and more recent or real-time telemetry data and automatically generate or package the backlogged telemetry data maintained at the gateway device 202 into a file capable of being uploaded to the IoT platform 120. For example, the software service at the gateway device 202 may automatically identify when an amount of time that has elapsed since a particular set of telemetry data samples is greater than a threshold amount of time utilized to differentiate backlogged data from real-time data, and when the elapsed time is greater than that real-time classification threshold amount of time, the software service at the gateway device 202 automatically packages those backlogged telemetry data samples into a file or other logical data container having an appropriate format for processing at the IoT platform 120. The IoT platform 120 includes a file upload service 302 that detects or otherwise identifies an uploaded file and writes the uploaded file to the data lake storage element 204.

The backlog file detection service 304 generally represents the process, subroutine or other component associated with the IoT platform ingestion service 200 that detects or otherwise identifies when a telemetry data file has been uploaded to the data lake storage element 204 and provides a corresponding notification or indication to a file parsing service 306. In this regard, in exemplary implementations, the backlog file detection service 304 analyzes the metadata associated with files uploaded to the data lake storage element 204 to detect or otherwise identify when the metadata associated with an uploaded file corresponds to backlogged telemetry data based on, for example, the file format and temporal metadata associated with the respective file. For example, when the backlog file detection service 304 identifies that the file format associated with the uploaded file corresponds to a comma-separated values (CSV) file format and includes metadata identifying that the contents of the file contain telemetry data having timestamps within a particular timeframe, the backlog file detection service 304 provides corresponding indication to the file parsing service 306 that a telemetry data file has been uploaded to the data lake storage element 204 and provide corresponding indication of the file (or the location thereof) in the data lake storage element 204 (e.g., by providing a filename or other information that may be utilized by the file parsing service 306 to access or retrieve the file contents). In this manner, the backlog file detection service 304 may ignore or otherwise disregard uploaded files that do not include telemetry data (e.g., a JavaScript Object Notation (JSON) file containing configuration data) by effectively filtering uploaded files based on their associated metadata and file formats without downloading or accessing the file contents.

The file parsing service 306 generally represents the process, subroutine or other component associated with the IoT platform ingestion service 200 that receives indication of an uploaded telemetry data file from the backlog file detection service 304, and then utilizes the information provided by the backlog file detection service 304 to download, retrieve or otherwise access the uploaded telemetry data file in the data lake storage element 204. The file parsing service 306 obtains the telemetry data samples from the uploaded telemetry data file in the data lake storage element 204 and generates corresponding telemetry data messages provided to the historical message bus 214 for subsequent processing by the historical time series writer 226 to write the backlogged historical telemetry data samples from the uploaded file to the time series database 206 in a similar manner as described above.

Figure 4:
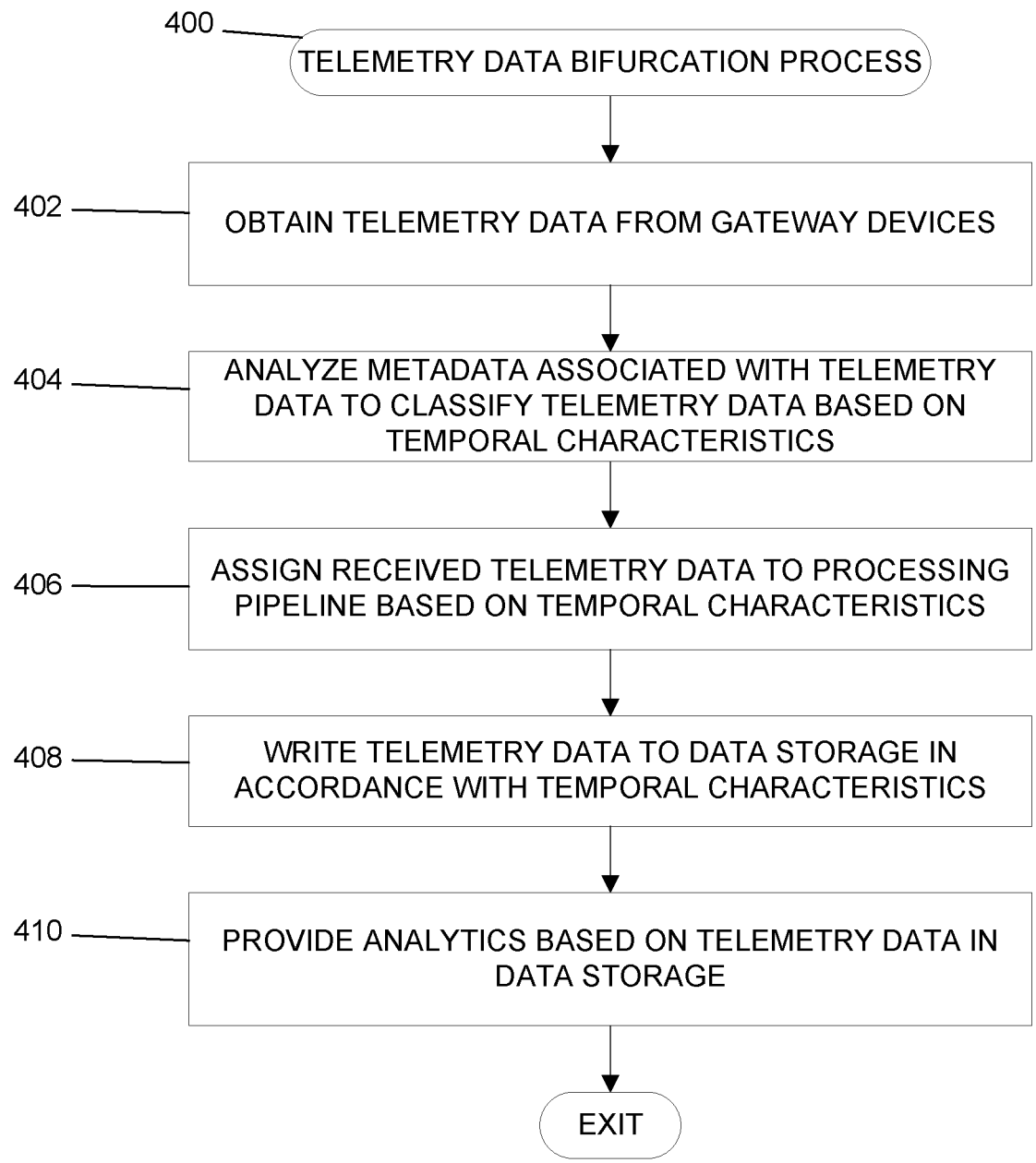
FIG. 4 is a flow diagram of a telemetry data bifurcation process suitable for implementation by an IoT platform service in the computing system of FIG. 1 in an exemplary embodiment.

FIG. 4 depicts an exemplary embodiment of a telemetry data bifurcation process 400 suitable for implementation by an IoT platform, such as IoT platform 120 or another suitable IIoT platform, to bifurcate telemetry data into separate and distinct processing pipelines based on time or other temporal characteristics. The various tasks performed in connection with the illustrated process may be implemented using hardware, firmware, software executed by processing circuitry, or any combination thereof. For illustrative purposes, the following description may refer to elements mentioned above in connection with FIGS. 1-3. In practice, portions of the telemetry data bifurcation process 400 may be performed by different elements of an IoT system or other cloud-based computing system. That said, exemplary embodiments are described herein in the context of the telemetry data bifurcation process 400 being primarily performed by the IoT platform 120 and/or services 122, 124, 200, 300 supported by the IoT platform 120 at the cloud-based computing system 102. It should be appreciated that the telemetry data bifurcation process 400 may include any number of additional or alternative tasks, the tasks need not be performed in the illustrated order and/or the tasks may be performed concurrently, and/or the telemetry data bifurcation process 400 may be incorporated into a more comprehensive procedure or process having additional functionality not described in detail herein. Moreover, one or more of the tasks shown and described in the context of FIG. 4 could be omitted from a practical embodiment of the telemetry data bifurcation process 400 as long as the intended overall functionality remains intact.

The illustrated telemetry data bifurcation process 400 initializes or otherwise begins by receiving or otherwise obtaining telemetry data from one or more gateway devices deployed at different edge computing systems (task 402). For example, as described above, various different instances of gateway devices 140 may be deployed at any number of different instances of edge computing system 104 to receive or otherwise obtain telemetry data associated with the respective building, warehouse, distribution center, industrial facility or other site where the respective gateway device 140 is deployed from various other edge devices 142, 144, 146 that are collocated with the gateway device 140 or otherwise deployed to the same site. The different gateway devices 140 may continually, periodically and/or asynchronously upload telemetry data from the respective sites to the IoT platform 120 over the network 106 independent from one another in accordance with the respective configuration of the respective gateway device 140, depending on the particular implementation, connectivity state, network conditions, and/or the like. In this regard, some gateway devices 140 may continually stream real-time telemetry data from a site to the IoT platform 120, while other gateway devices 140 may buffer or batch telemetry data that is accumulated and subsequently uploaded (e.g., once connectivity is restored after an outage). Depending on the implementation, a gateway device 140 may upload accumulated telemetry data in a series or stream of telemetry data messages containing telemetry data samples, while other implementations of the gateway device may upload accumulated telemetry data as a file or other logical container that encapsulates and contains telemetry data messages or samples.

The telemetry data bifurcation process 400 parses, scans or otherwise analyzes metadata associated with the uploaded telemetry data to classify or otherwise assign the telemetry data based on temporal characteristics (task 404). In exemplary implementations, the telemetry data bifurcation process 400 bifurcates the uploaded telemetry data into either real-time telemetry data or historical telemetry data, depending on whether an elapsed amount of time between a telemetry data sample is greater than a real-time classification threshold amount of time. In this regard, more recent telemetry data samples where the elapsed time between the current time and the respective sample time is less than the real-time classification threshold are considered real-time and suitable for more expeditious processing, while telemetry data samples where the elapsed time between the current time and the respective sample time is greater than the real-time classification threshold are considered to be backlogged or historical telemetry data samples. That said, it should be appreciated that the subject matter described herein is not intended to be limited to any particular type or number of different groups or processing pipelines that may be implemented in connection with the telemetry data bifurcation process 400. For example, some implementations of the telemetry data bifurcation process 400 may assign telemetry data obtained within a first preceding time period to a real-time group (e.g., telemetry data samples obtained within the last minute), while assigning telemetry data obtained within another time period to an intermediate group (e.g., telemetry data samples obtained within the last fifteen minutes) and assigning any other older telemetry data samples to a backlogged historical group (e.g., telemetry data samples more than fifteen minutes old).

As described above in the context of FIGS. 2-3, where telemetry data samples are uploaded in the form of telemetry data messages (e.g., where the software at the gateway device 140 fills a 256 kilobyte telemetry data message with as many telemetry data samples possible), the time slicing service 210 at the data ingestion service 122, 200, 300 of the IoT platform 120 analyzes the timestamp associated with the most recent telemetry data sample in the message to determine whether the most recent telemetry data sample is considered to represent real-time telemetry data. In this regard, the time slicing service 210 assigns the telemetry data message to the real-time telemetry data group when the elapsed time since the timestamp associated with the most recent telemetry data sample in the message is less than the real-time classification threshold. On the other hand, when the elapsed time since the timestamp associated with the most recent telemetry data sample in the message is greater than the real-time classification threshold, the time slicing service 210 assigns the telemetry data message to the backlogged or historical telemetry data group. In this manner, the respective subsets of telemetry data classified as real-time or historical are mutually exclusive, such that telemetry data messages (or telemetry data samples) assigned to one of the groups is not also assigned to the other group. As described above in the context of FIG. 3, additionally, in some implementations of the telemetry data bifurcation process 400, a backlog file detection service 304 at the data ingestion service 122, 300 of the IoT platform 120 also analyzes metadata associated with uploaded files to detect or otherwise identify when an uploaded file in the data lake storage element 204 includes telemetry data samples to be assigned to the historical telemetry data group.

Still referring to FIG. 4, after classifying telemetry data based on temporal characteristics, the telemetry data bifurcation process 400 continues by assigning or otherwise distributing the classified telemetry data to the appropriate processing pipeline based on the temporal characteristics (task 406). As described above, for uploaded telemetry data classified as real-time, the time slicing service 210 routes, writes, transmits or otherwise provides the corresponding telemetry data messages to the real-time message bus 212, which functions as an event bus or an event hub for future servicing by downstream event consumers (e.g., real-time writers 220, 224). On the other hand, for uploaded telemetry data classified as historical, the time slicing service 210 routes, writes, transmits or otherwise provides the corresponding telemetry data messages to the historical message bus 214, which functions as a second event bus or event hub distinct from the real-time message bus 212 for future servicing by different downstream event consumers (e.g., historical writers 222, 226). For backlogged or historical telemetry data samples contained in an uploaded file, a file parsing service 306 at the data ingestion service 122, 300 of the IoT platform 120 access or otherwise retrieves the uploaded file to extract the historical telemetry data samples from the file and then writes or otherwise provides corresponding telemetry data messages including those extracted historical telemetry data samples to the historical message bus 214.

After bifurcating telemetry data into different processing pipeline based on temporal characteristics, the illustrated telemetry data bifurcation process 400 continues by writing telemetry data to data storage associated with the cloud-based system in accordance with their respective temporal characteristics before providing analytics based on the telemetry data maintained in the data storage associated with the cloud-based system (tasks 408, 410). In this regard, the real-time writers 220, 224 are configured to service the real-time message bus 212 at a first rate or frequency to write telemetry data samples to the data lake storage element 204 and the time series database 206, respectively, to enable the analytics services 124 of the IoT platform 120 to provide real-time analytics, reports or other user notifications substantially in real-time with minimal latency based on the real-time telemetry data maintained in the respective data storage elements 204, 206. As described above, the autoscaling configuration or settings associated with the respective real-time writers 220, 224 may be configured to respond more quickly to increases in telemetry data messages (or events) associated with the real-time message bus 212 to reduce latency and ensure the real-time telemetry data is written to the data storage elements 204, 206 with minimal delay.

The historical writers 222, 226 are configured to service the historical message bus 214 at a different rate or frequency relative to the real-time writers 220, 224 to write backlogged or historical telemetry data samples to the respective storage elements 204, 206 in parallel with and concurrently to the real-time writers 220, 224. In this regard, due to the existing latency inherent to backlogged or historical data, the rate or frequency at which the historical writers 222, 226 service the historical message bus 214 may be slower than the real-time writers 220, 224. As described above, the autoscaling configuration or settings associated with the respective historical writers 222, 226 may also be configured to respond more slowly to increases in telemetry data messages (or events) associated with the historical message bus 214 to conserve processing resources (e.g., to maintain resource availability for the real-time writers 220, 224). That said, the historical writers 222, 226 write backlogged or historical telemetry data samples to the respective storage elements 204, 206 to backfill the telemetry data and continuity in the telemetry data associated with a particular site, thereby enabling the analytics services 124 of the IoT platform 120 to provide trend analysis and other analytics, reports or other user notifications that are influenced by the historical telemetry data in addition to the real-time telemetry data from that site.

Figure 5:
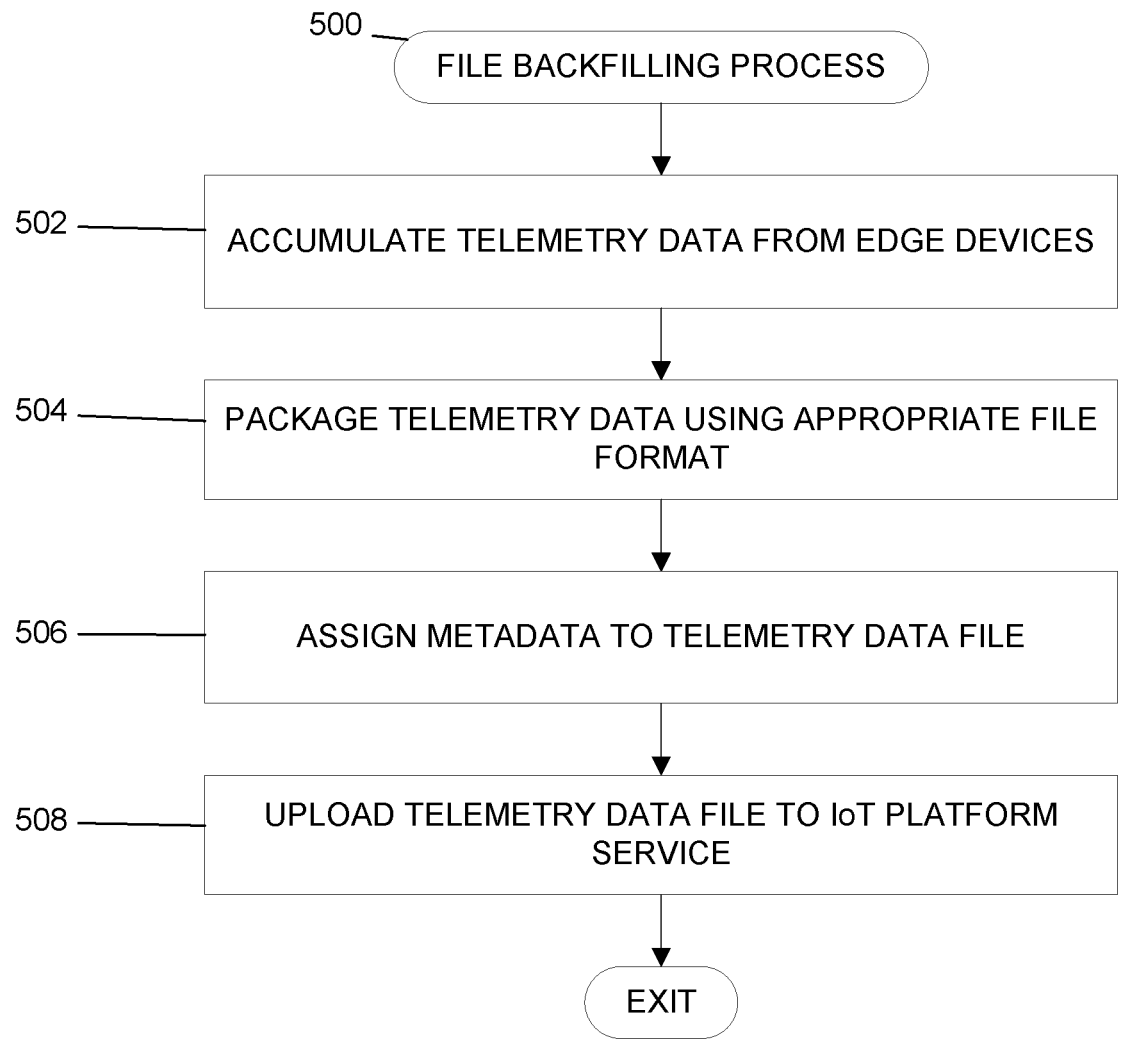
FIG. 5 is a flow diagram of a file backfilling process suitable for implementation by a gateway device in the computing system of FIG. 1 in an exemplary embodiment.

FIG. 5 depicts an exemplary embodiment of a file backfilling process 500 suitable for implementation by a gateway device to upload backlogged telemetry data to an IoT platform to backfill a time series data set. The various tasks performed in connection with the illustrated process may be implemented using hardware, firmware, software executed by processing circuitry, or any combination thereof. In exemplary implementations, code or other computer-executable programming instructions for performing, executing or otherwise supporting the file backfilling process 500 are stored or otherwise maintained in a data storage element or other computer-readable medium associated with a gateway device that, when read and executed by a processing system of the gateway device, are configurable to cause the processing system to support or otherwise perform certain tasks, operations, functions, and/or processes described herein. It should be appreciated that the file backfilling process 500 may include any number of additional or alternative tasks, the tasks need not be performed in the illustrated order and/or the tasks may be performed concurrently, and/or the file backfilling process 500 may be incorporated into a more comprehensive procedure or process having additional functionality not described in detail herein. Moreover, one or more of the tasks shown and described in the context of FIG. 5 could be omitted from a practical embodiment of the file backfilling process 500 as long as the intended overall functionality remains intact.

In exemplary implementations, the file backfilling process 500 is automatically initiated by or at a gateway device in response to detecting an anomalous condition that prevents or otherwise impairs the ability of the gateway device to stream telemetry data to the IoT platform substantially in real-time. Depending on the scenario, the anomalous condition could exist with respect to the communications network 106 between the gateway device 140 and the IoT platform 120, with respect to the site where the gateway device 140 is deployed or with respect to the gateway device 140 itself. In response to detecting an anomalous condition, the gateway device automatically accumulates telemetry data samples received from other edge devices and then packages or otherwise encapsulates those backlogged telemetry data samples into an appropriate file format supported by an IoT platform service (tasks 502, 504). In this regard, the software at the gateway device 140 is configurable to automatically package backlogged telemetry data samples received from other edge devices 142, 144, 146 into a file having a file format that is supported by and/or recognizable by the backlog file detection service 304 and/or the file parsing service 306 using a known schema, such as, for example, a CSV file.

The file backfilling process 500 continues by automatically assigning metadata to the file that identifies temporal characteristics associated with the telemetry data contained within the file and automatically uploading the file to the IoT platform when the anomalous condition subsides or some other condition is satisfied for uploading the backlogged telemetry data file to the IoT platform (tasks 506, 508). For example, the software at the gateway device 140 may be configurable to automatically assign metadata to a CSV file containing backlogged telemetry data that identifies the timestamps associated with telemetry data samples contained within the file, that identifies the file contains backlogged telemetry data to be backfilled to the time series database 206, or otherwise provides indicia to the backlog file detection service 304 that the uploaded file requires processing by the file parsing service 306 and/or the historical time series writer 226. After the anomalous condition resolves, the gateway device 140 automatically uploads the backlogged telemetry data file to the file upload service 302 associated with the IoT platform data ingestion service 122, 300. After the file upload service 302 writes the backlogged telemetry data file to the data lake storage element 204, the backlog file detection service 304 analyzes the metadata associated with the file to detect that it is a backlogged telemetry data file and provides corresponding notification to the file parsing service 306. In this regard, by virtue of the gateway device 140 generating the upload file using a file format and schema supported by the file parsing service 306, the file parsing service 306 is capable of extracting telemetry data samples from the uploaded file and generating corresponding telemetry data messages provided to the historical message bus 214 to facilitate the historical time series writer 226 backfilling the time series data set for the site associated with the gateway device 140 with the telemetry data samples contained in the uploaded file without impairing the ability of the real-time processing pipeline at the IoT platform data ingestion service 122, 200, 300 from processing real-time telemetry data from that gateway device 140 or other gateway devices 140.

As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules)

may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an ASIC.

The subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an embodiment of the depicted subject matter. In addition, certain terminology may also be u sed herein for the purpose of reference only, and thus are not intended to be limiting.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of managing data uploaded to a cloud-based computing system over a network from a gateway device at a site, the method comprising:
    obtaining, by a platform service at a server of the cloud-based computing system, telemetry data from the gateway device;
    assigning, by the platform service, a first subset of the telemetry data having first temporal characteristics to a first processing pipeline of the cloud-based computing system and a second subset of the telemetry data having second temporal characteristics to a second processing pipeline of the cloud-based computing system based at least in part on metadata associated with the telemetry data, wherein:
       the first subset and the second subset are mutually exclusive;
       the first temporal characteristics and the second temporal characteristics are different; and
       the first processing pipeline is configurable to write the first subset of the telemetry data to a data storage element concurrent to the second processing pipeline writing the second subset of the telemetry data to the data storage element.

2. The method of claim 1, further comprising:
    classifying the first subset of the telemetry data as real-time telemetry data based on the first temporal characteristics; and
    classifying the second subset of the telemetry data as historical telemetry data based on the second temporal characteristics, wherein the first processing pipeline comprises a real-time processing pipeline and the second processing pipeline comprises a historical processing pipeline.

3. The method of claim 2, wherein the real-time processing pipeline is configurable to write the real-time telemetry data to the data storage element with reduced latency relative to the historical processing pipeline writing the historical telemetry data to the data storage element.

4. The method of claim 3, wherein the data storage element comprises a time series database.

5. The method of claim 1, wherein:
    obtaining the telemetry data comprises obtaining a stream of messages from the gateway device;
    the first subset comprises a first subset of messages of the stream of messages; and
    the second subset comprises a second subset of messages of the stream of messages.

6. The method of claim 5, further comprising, for each message of the stream of messages:
    assigning the respective message to the first subset of messages when an elapsed time since a timestamp associated with a most recent sample of telemetry data of the respective message is less than a first threshold; and
    assigning the respective message to the second subset of messages when the elapsed time since the timestamp associated with the most recent sample of telemetry data of the respective message is greater than the first threshold.

7. The method of claim 1, wherein:
    obtaining the telemetry data comprises obtaining a file including historical telemetry data uploaded from the gateway device; and
    assigning the second subset of the telemetry data comprises the platform service assigning the historical telemetry data to the second processing pipeline based at least in part on the metadata associated with the file.

8. The method of claim 7, wherein:
    the data storage element comprises a time series database;
    the second processing pipeline comprises a historical processing pipeline; and
    the first processing pipeline comprises a real-time processing pipeline configurable to write real-time telemetry data to the time series database with reduced latency relative to the historical processing pipeline writing the historical telemetry data to the time series database.

9. A computer-readable medium having computer-executable instructions stored thereon that, when executed by a processing system of a cloud-based computing system, cause the processing system to:
    obtain telemetry data from a gateway device; and
    assign a first subset of the telemetry data having first temporal characteristics to a first processing pipeline of the cloud-based computing system and a second subset of the telemetry data having second temporal characteristics to a second processing pipeline of the cloud-based computing system based at least in part on metadata associated with the telemetry data, wherein:
       the first subset and the second subset are mutually exclusive;
       the first temporal characteristics and the second temporal characteristics are different; and
       the first processing pipeline is configurable to write the first subset of the telemetry data to a data storage element concurrent to the second processing pipeline writing the second subset of the telemetry data to the data storage element.

10. The computer-readable medium of claim 9, wherein the instructions are configurable to cause the processing system to classify the first subset of the telemetry data as real-time telemetry data based on the first temporal characteristics and classify the second subset of the telemetry data as historical telemetry data based on the second temporal characteristics, wherein the first processing pipeline comprises a real-time processing pipeline and the second processing pipeline comprises a historical processing pipeline.

11. The computer-readable medium of claim 10, wherein the real-time processing pipeline is configurable to write the real-time telemetry data to the data storage element with reduced latency relative to the historical processing pipeline writing the historical telemetry data to the data storage element.

12. The computer-readable medium of claim 9, wherein:
the telemetry data comprises a stream of messages from the gateway device;
the first subset comprises a first subset of messages of the stream of messages; and
the second subset comprises a second subset of messages of the stream of messages.

13. The computer-readable medium of claim 12, wherein, for each message of the stream of messages, the instructions are configurable to cause the processing system to:
assigning the respective message to the first subset of messages when an elapsed time since a timestamp associated with a most recent sample of telemetry data of the respective message is less than a first threshold; and
assigning the respective message to the second subset of messages when the elapsed time since the timestamp associated with the most recent sample of telemetry data of the respective message is greater than the first threshold.

14. The computer-readable medium of claim 9, wherein:
the telemetry data comprises a file including historical telemetry data uploaded from the gateway device to a data lake storage element;
the instructions are configurable to cause the processing system to assign the historical telemetry data to the second processing pipeline based at least in part on the metadata associated with the file;
the second processing pipeline comprises a historical processing pipeline; and
the first processing pipeline comprises a real-time processing pipeline configurable to write real-time telemetry data to a time series database with reduced latency relative to the historical processing pipeline writing the historical telemetry data to the time series database.

15. A cloud-based computing system comprising:
a data storage element; and
a server coupled to the data storage element and a network to provide a platform service for obtaining telemetry data uploaded to the cloud-based computing system over the network from a gateway device at a site, wherein the platform service is configurable to assign a first subset of the telemetry data having first temporal characteristics to a first processing pipeline of the cloud-based computing system and a second subset of the telemetry data having second temporal characteristics to a second processing pipeline of the cloud-based computing system based at least in part on metadata associated with the telemetry data, wherein:
the first subset and the second subset are mutually exclusive;
the first temporal characteristics and the second temporal characteristics are different; and
the first processing pipeline is configurable to write the first subset of the telemetry data to a data storage element concurrent to the second processing pipeline writing the second subset of the telemetry data to the data storage element.

16. The cloud-based computing system of claim 15, wherein the first processing pipeline is configurable to write the first subset of the telemetry data to the data storage element with reduced latency relative to the second processing pipeline writing the second subset of the telemetry data to the data storage element.

17. The cloud-based computing system of claim 16, wherein the data storage element comprises a time series database.

18. The cloud-based computing system of claim 17, further comprising a data lake storage element coupled to the server, wherein the platform service is configurable to obtain a file comprising historical telemetry data uploaded by the gateway device from the data lake storage element and assign the historical telemetry data to the second processing pipeline based at least in part on the metadata associated with the file.

19. The cloud-based computing system of claim 15, wherein:
the telemetry data comprises a stream of messages; and
for each message of the stream of messages, the platform service is configurable to:
assign the respective message to the first subset of the telemetry data when an elapsed time since a timestamp associated with a most recent telemetry data sample of the respective message is less than a first threshold; and
assign the respective message to the second subset of the telemetry data when the elapsed time since the timestamp associated with the most recent telemetry data sample of the respective message is greater than the first threshold.

20. The cloud-based computing system of claim 19, wherein the first processing pipeline is configurable to write the first subset of the telemetry data to the data storage element with reduced latency relative to the second processing pipeline writing the second subset of the telemetry data to the data storage element.

* * * * *